US009427929B2

(12) United States Patent
Torai et al.

(10) Patent No.: US 9,427,929 B2
(45) Date of Patent: Aug. 30, 2016

(54) FILTER MANUFACTURING MACHINE, FILTER MANUFACTURING METHOD USING THE MACHINE, AND HOLLOW FILTER

(71) Applicant: JAPAN TOBACCO INC., Tokyo (JP)

(72) Inventors: Hiroyuki Torai, Tokyo (JP); Satoshi Nakamura, Tokyo (JP)

(73) Assignee: JAPAN TOBACCO INC., Tokyo (JP)

( * ) Notice: Subject to any disclaimer, the term of this patent is extended or adjusted under 35 U.S.C. 154(b) by 246 days.

(21) Appl. No.: 14/039,613

(22) Filed: Sep. 27, 2013

(65) Prior Publication Data

US 2014/0034571 A1   Feb. 6, 2014

Related U.S. Application Data

(63) Continuation of application No. PCT/JP2012/056908, filed on Mar. 16, 2012.

(30) Foreign Application Priority Data

Mar. 31, 2011 (JP) ................................. 2011-078331

(51) Int. Cl.
*B31D 5/00* (2006.01)
*B01D 39/14* (2006.01)
*A24D 3/02* (2006.01)

(52) U.S. Cl.
CPC ............ *B31D 5/0082* (2013.01); *A24D 3/0233* (2013.01); *A24D 3/0279* (2013.01); *B01D 39/14* (2013.01)

(58) Field of Classification Search
None
See application file for complete search history.

(56) References Cited

U.S. PATENT DOCUMENTS

| | | | | |
|---|---|---|---|---|
| 3,095,343 A | * | 6/1963 | Berger | ................. A24D 3/0233 131/343 |
| 3,615,382 A | * | 10/1971 | Manilla et al. | ................. 419/38 |
| 4,037,524 A | | 7/1977 | Hall | |
| 4,639,318 A | * | 1/1987 | Andersson | ......... B01D 39/2082 210/491 |

FOREIGN PATENT DOCUMENTS

| | | |
|---|---|---|
| JP | 57-1226 B2 | 1/1982 |
| JP | 3022624 B2 | 3/2000 |

* cited by examiner

*Primary Examiner* — Michael H Wilson
*Assistant Examiner* — Katherine Will
(74) *Attorney, Agent, or Firm* — Birch, Stewart, Kolasch & Birch, LLP

(57) ABSTRACT

A filter manufacturing machine includes a forming device for forming filter tow into a hollow rod-shaped continuous filter body, a forming tube included in the forming device and having a tubular forming path through which the filter tow is passed while being brought together, a mandrel arranged in the forming tube and forming the tubular forming path in cooperation with the forming tube, and a heat treating section included in the forming tube and configured to heat the filter tow while the filter tow passes through the tubular forming path. The mandrel has a small-diameter portion located at the inlet of the forming tube, a large-diameter portion located at the outlet of the forming tube, and a diameter expansion portion located between the small- and large-diameter portions. The diameter expansion portion is located downstream of the heat treating section as viewed in the moving direction of the filter tow.

7 Claims, 3 Drawing Sheets

FILTER MANUFACTURING MACHINE, FILTER MANUFACTURING METHOD USING THE MACHINE, AND HOLLOW FILTER

CROSS REFERENCE TO RELATED APPLICATIONS

This application is a Continuation of PCT International Application No. PCT/JP2012/056908 filed on Mar. 16, 2012, which claims priority under 35 U.S.C. 119(a) to Application No. 2011-078331 filed in Japan on Mar. 31, 2011, all of which are hereby expressly incorporated by reference into the present application.

TECHNICAL FIELD

The present invention relates to a filter manufacturing machine for making hollow filters from filter fibers, a filter manufacturing method using the machine, and hollow filters.

BACKGROUND ART

Conventional filter manufacturing machines include a storage vessel storing, for example, acetate tow for use as filter fibers, and the tow (filter fibers) is fed from the storage vessel along a predetermined feed path. In the process of feeding, the tow is bloomed. Subsequently, a plasticizer such as triacetin is added to the tow, and the tow is supplied to a rod forming device. In the rod forming device, the tow is formed into a rod, and the rod-shaped tow is wrapped in paper to continuously form a filter rod.

The tow is formed into a rod by means of a section called forming tube. While passing through the forming tube, the tow is compressed and formed into a rod. There has also been known a technique whereby the tow is formed into a rod and at the same time a through hole is formed in the rod to obtain a hollow cylindrical rod while the tow passes through the forming tube.

In order to make such a through hole in the rod, a mandrel is previously arranged inside the forming tube in alignment with the axis of the forming tube. The tow introduced into the forming tube is formed into a rod around the mandrel, continuously delivered, and pulled out of the mandrel, whereupon the rod with a through hole is obtained. It is, however, often the case that the tow projects inward from the surface defining the through hole, and a filter rod with such a through hole is regarded as low in quality and rejected as a defective article. Also, if the surface region of the filter rod around the through hole is not satisfactorily high in hardness, the through hole is crushed when the filter rod is cut in a subsequent process, leading to lowering of the quality. In order to prevent crushing of the through hole, the amount of the plasticizer used may be increased to thereby increase the hardness of the filter. If the plasticizer is used in a large amount, however, a problem arises in that the filter itself is dissolved or gives off an offensive smell.

Projection of the tow from the surface defining the through hole is thought to occur for the following reasons. Since the mandrel has an outer shape with the same diameter and size as those of the through hole to be formed, the fiber density of the tow becomes uneven and also the tow is not acted upon by a force that presses the surface of the through hole from inside. Further, the fibers forming the tow are allowed to adhere to each other only at the moment the tow is introduced into the gap between the forming parts, and therefore, adhesion of the tow is not high enough. The consequent projection of the tow from the surface defining the through hole spoils the appearance of filters obtained.

On the other hand, Patent Document 1 discloses an apparatus for manufacturing a hollow cylindrical filter rod. In this manufacturing apparatus, a tube is arranged in alignment with the axis of a filter rod to be formed, and tow is gathered around the tube and hardened to form a hollow filter. The apparatus, however, requires an additional member, namely, the tube, which leads to increase in the number of component parts. Also, a tube feed mechanism needs to be additionally provided, making the apparatus and its control complex.

PRIOR ART DOCUMENTS

Patent Documents

Patent Document 1: U.S. Pat. No. 3,095,343

SUMMARY OF THE INVENTION

Problems to be solved by the Invention

An object of the present invention is to provide a filter manufacturing machine capable of preventing tow from projecting from the surface defining a through hole in a filter produced thereby, a filter manufacturing method using the machine, and a hollow filter.

Means for Solving the Problems

To achieve the object, the present invention provides a filter manufacturing machine comprising: a feed path along which filter tow is continuously fed; a forming device connected to a tail end of the feed path, the forming device being configured to form the filter tow into a hollow rod-shaped continuous filter body and send out the formed continuous filter body; a forming tube included in the forming device and having a tubular forming path through which the filter tow is passed while being brought together to be formed into the continuous filter body; a mandrel arranged in the forming tube and forming the tubular forming path in cooperation with the forming tube; and a heat treating section included in the forming tube and configured to heat the filter tow while the filter tow passes through the tubular forming path, wherein the mandrel has a small-diameter portion located at an inlet of the forming tube, a large-diameter portion located at an outlet of the forming tube, and a diameter expansion portion located between the small- and large-diameter portions, and the diameter expansion portion of the mandrel is located downstream of the heat treating section as viewed in a moving direction of the filter tow.

Preferably, the large-diameter portion of the mandrel has an outer diameter equal to a diameter of a through hole to be formed in a filter as an end product.

Preferably, the diameter expansion portion is a stepped shoulder formed on an outer surface of the mandrel.

Preferably, the diameter expansion portion is a taper continuously formed on an outer surface of the mandrel.

Preferably, the taper includes the small-diameter portion.

Preferably, the heat treating section is arranged in such a position as to heat the small-diameter portion.

The present invention also provides a filter manufacturing method using the above filter manufacturing machine, wherein, when a filter with a through hole is formed by feeding the filter tow into a gap between the forming tube and the mandrel, the through hole is formed by the small-diameter portion, and the through hole formed by the small-diameter portion is enlarged by the large-diameter portion.

Further, the present invention provides a hollow filter made of filter tow that has been passed through a tubular forming path defined by a cylindrical forming tube and a mandrel arranged in alignment with an axis of the forming tube, and obtained by cutting a continuous filter body having a through hole along an axis thereof in alignment with the mandrel, wherein the through hole is formed by a small-diameter portion of the mandrel and is then enlarged by a large-diameter portion of the mandrel having a larger diameter than the small-diameter portion, and the filter tow forming the continuous filter body has a higher fiber density in a portion surrounding the through hole than in a radially outward portion thereof.

Advantageous Effects of the Invention

According to the present invention, the mandrel has the small-diameter portion located at the inlet of the forming tube, the large-diameter portion located at the outlet of the forming tube, and the diameter expansion portion located between the small- and large-diameter portions. The diameter expansion portion is located downstream of the heat treating section as viewed in the moving direction of the filter tow. The filter tow is lumped by the heat treating section and has its outer shape formed by the tubular forming path of the forming tube, and the through hole is formed by the mandrel. That is, the through hole is formed around the outer shape of the mandrel. Then, as the filter tow further advances through the tubular forming path, the diameter of the through hole is enlarged by the diameter expansion portion. This makes it possible to obtain a filter of which the tow does not project into the through hole from its surface and which thus has good appearance. Also, the adhesion of fibers forming the filter tow improves. Further, since a large space is defined between the small-diameter portion and the forming tube, the tow is allowed to spread in the large space, thereby reducing unevenness of the fiber density of the filter tow in the vicinity of the through hole. It is therefore possible to stably manufacture filters with good quality.

The large-diameter portion of the mandrel has an outer diameter equal to the diameter of the through hole to be formed in the filter as an end product, and therefore, the through hole with a desired diameter can be formed in the through hole forming step, thus eliminating the need to perform machining or the like in subsequent steps.

Also, since the diameter expansion portion is the stepped shoulder formed on the outer surface of the mandrel, projection of the tow from the surface defining the through hole can be prevented by a simple structure.

The diameter expansion portion may alternatively be a taper continuously formed on the outer surface of the mandrel, and also in this case, the same advantageous effect can be achieved.

MODE FOR CARRYING OUT THE INVENTION

Figure 1:
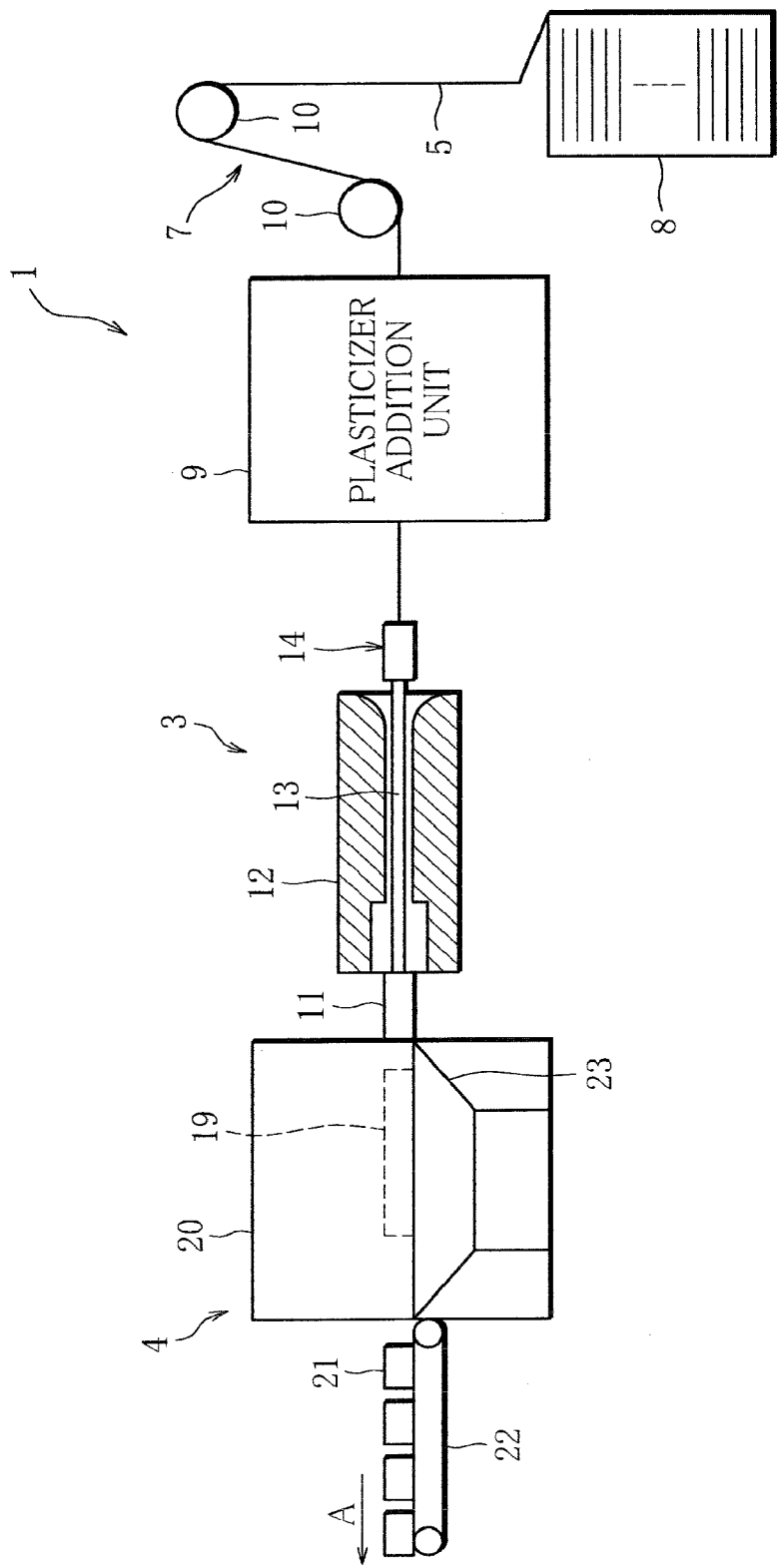
FIG. 1 schematically illustrates a filter manufacturing machine according to the present invention and its peripheral components.

A filter manufacturing machine 1 illustrated in FIG. 1 includes a feed path 7, a forming device 3, and a wrapping device 4. The feed path 7 is a path along which filter tow (fibers) 5 is continuously fed. A storage vessel 8 storing the filter tow 5 such as cellulose acetate fibers is arranged at the head end of the feed path 7. The feed path 7 has a plurality of (in the figure, two) guide rollers 10 and is connected to the forming device 3, described in detail later. Also, the feed path 7 is provided with a plasticizer addition unit 9. The plasticizer addition unit 9 is equipped with a conventionally known banding jet, a pair of pretension rollers, a pair of brooming rollers and the like (none of which is shown), and the filter tow 5 is first bloomed by these elements. Further, the plasticizer addition unit 9 is provided with a conventionally known sprayer (not shown) for adding a plasticizer to the tow 5. As a result, the tow 5 is hardened to some extent.

The forming device 3 for forming the tow 5 into a hollow rod-shaped continuous filter body 11 is connected the tail end of the feed path 7, as stated above. As is clear from FIG. 2, the forming device 3 includes a forming tube 12 and a mandrel 13. The forming tube 12 is in the form of a hollow cylinder and allows the tow 5 to pass therethrough (in a direction indicated by arrow F in FIG. 2) while bringing the tow 5 together. The tow 5 passes through a tubular forming path 2 in the forming tube 12. To stabilize the entry of the tow 5, the forming tube 12 may be configured such that an inlet part thereof has a gradually increasing inner diameter. Specifically, the tubular forming path 2 may have a curved, rounded shape in the inlet part such that the diameter thereof gradually increases toward the inlet. This makes it easier for the tow 5 to enter the tubular forming path 2, thereby improving productivity. A separate trumpet guide or the like may be provided at the inlet of the forming tube 12 in order to obtain a similar effect. The tubular forming path 2 is defined by the forming tube 12 in cooperation with the mandrel 13, as described in detail later.

The mandrel 13 is arranged in alignment with the axis of the forming tube 12 and serves to make a through hole 15 in the continuous filter body 11. That is, the rod-shaped filter tow 5 that has passed through the forming tube 12 has the through hole 15 corresponding in shape to the mandrel 13. The tow 5 is heat-treated inside the forming tube 12 to be formed into the continuous filter body 11. The heat treatment is carried out by a heat treating section 17. In the illustrated example, the heat treating section 17 includes holes 18 formed through the peripheral wall of the forming tube 12, and steam is blown into the forming tube 12 through the holes 18 (in directions indicated by arrows I in FIG. 2). The steam is introduced to a spot (specifically, a small-diameter portion 13a, described later) where the filter is actually being produced by the mandrel 13. Instead of steam, microwave or hot air may be used, or a different heat source such as electrically heated wire may be used. While passing through the tubular forming path 2, the filter tow 5 is increased in plasticity and lumped by the heat treating section 17.

The wrapping device 4 includes a rod forming section 20, where the continuous filter body 11 is cut to a predetermined length on a table 23. More specifically, the filter body 11 is wrapped in wrapping paper (not shown) to form a filter rod 19, and the filter rod 19 is cut by a cutter (not shown) to obtain filter plugs 21. These steps are executed by using equipment conventionally known in the art. The filter plugs 21 are then supplied to a subsequent process (in a direction indicated by arrow A in FIG. 1) by a garniture belt 22.

Figure 2:
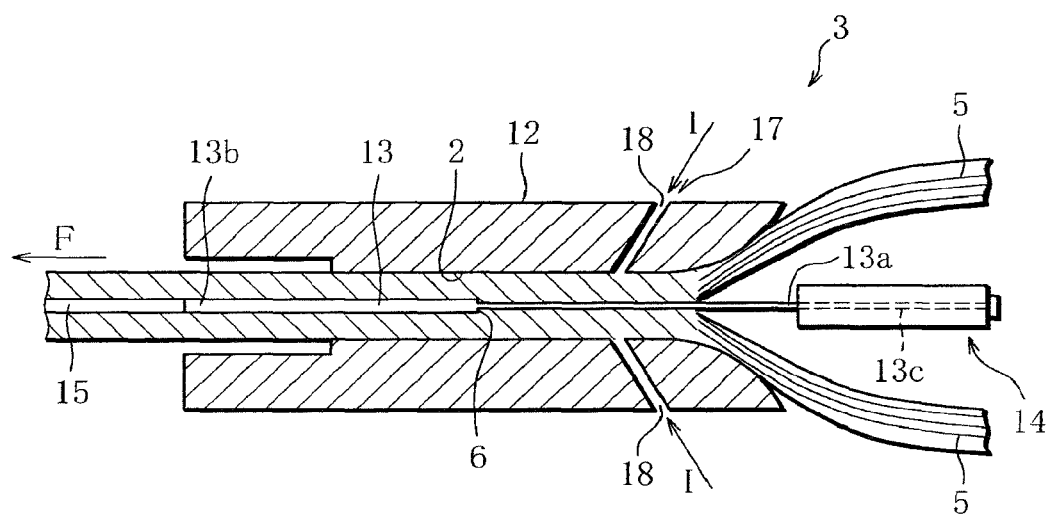
FIG. 2 schematically illustrates a tubular forming path and its vicinities.

As is clear from FIG. 2, the mandrel 13 has a small-diameter portion 13a located at the inlet of the forming tube 12 and a large-diameter portion 13b located at the outlet of the forming tube 12, and a diameter expansion portion 6 is formed between the small- and large-diameter portions 13a and 13b. While the mandrel 13 is set in the forming tube 12, the diameter expansion portion 6 is located downstream of the heat treating section 17 as viewed in the direction of movement of the filter tow 5 through the tubular forming path 2. In other words, the heat treating section 17 is arranged so as to correspond in position to the small-diameter portion 13a and heats the filter tow 5 moving along the small-diameter portion 13a. The filter tow 5 is lumped by the heat treating section 17 as stated above, and as the filter tow lumps within the tubular forming path 2, the outer shape of the filter tow is formed by the forming tube 12 while the through hole of the filter tow is formed by the mandrel 13. Namely, the through hole 15 is formed around the outer shape of the mandrel 13. Thus, the through hole 15 having a cross-sectional shape corresponding to that of the mandrel 13 can be formed and may have any desired cross-sectional shape such as geometrical figures including, for example, a circle, triangle, quadrilateral and star. Also, the small-diameter portion 13a and the large-diameter portion 13b may have different cross-sectional shapes.

While moving along the small-diameter portion 13a, the tow 5 is formed into a shape of filter with the through hole 15 by the heat treating section 17. As the tow 5 advances thereafter to the large-diameter portion 13b via the diameter expansion portion 6, the through hole 15 is enlarged in diameter with its surface pushed radially outward by the large-diameter portion 13b. The mandrel 13 has a grip portion 13c extending upstream from the small-diameter portion 13a as viewed in the moving direction of the filter tow 5, and the grip portion 13c is securely held by a holder 14.

Since the surface defining the through hole 15 is pressed and firmed as stated above, the tow 5 can be prevented from projecting from the surface of the through hole 15, making it possible to obtain filters with good appearance. Also, the surface defining the through hole 15 is pushed radially outward for enlargement during travel of the tow 5, and thus adhesion between individual fibers of the tow 5 improves. Further, since a large space is defined between the small-diameter portion and the forming tube, the tow is allowed to spread in the large space, thereby reducing unevenness of the fiber density of the filter tow 5 in the vicinity of the through hole 15. It is therefore possible to stably manufacture filters with good quality. The filter formed in this manner has a higher fiber density in the vicinity of the through hole 15 than in the radially outward portion.

The outer diameter of the large-diameter portion 13b of the mandrel 13 may be set to be equal to the diameter of the through hole 15 to be formed in the filter as an end product, and in this case, the through hole 15 with a desired diameter can be formed in the through hole forming step, thus eliminating the need to perform machining or the like in subsequent steps.

Figure 3:
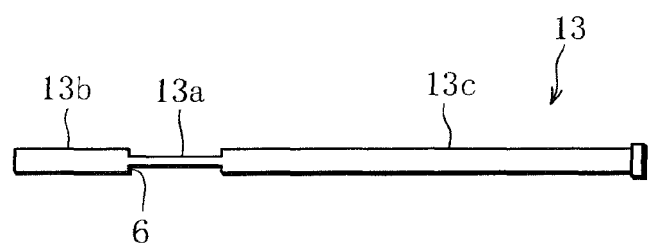
FIG. 3 schematically illustrates a mandrel.

As is clear from FIG. 3, the diameter expansion portion 6 is a stepped shoulder formed on the outer surface of the mandrel 13. Since the small- and large-diameter portions 13a and 13b can be formed just by providing the mandrel 13 with such a stepped shoulder as the diameter expansion portion 6, projection of the tow from the surface defining the through hole 15 can be prevented by a simple structure and also the aforementioned various advantageous effects can be obtained. In the illustrated example, the large-diameter portion 13b is 41 mm in length, the small-diameter portion 13a is 30 mm in length, and the grip portion 13c is 125 mm in length. The diameter of the small-diameter portion 13a is 2.2 mm, and the diameter of the large-diameter portion 13b is 3.2 mm, for example.

Figure 4:
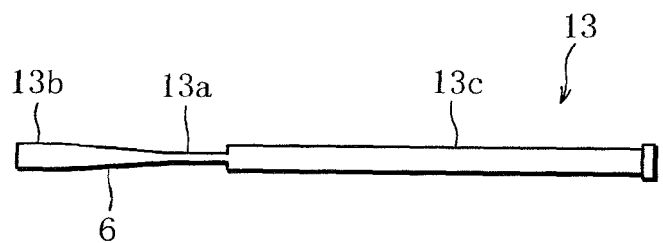
FIG. 4 schematically illustrates another mandrel.
Figure 5:
FIG. 5 schematically illustrates still another mandrel.

Alternatively, as clearly shown in FIG. 4, the diameter expansion portion 6 may be a taper continuously formed on the outer surface of the mandrel 13. Where the diameter expansion portion 6 is constituted by such a taper, the surface defining the through hole 15 can be gradually pushed radially outward, whereby projection of the tow from the surface of the through hole 15 can be prevented by a simple structure, like the example illustrated in FIG. 3, and also the aforementioned various advantageous effects can be obtained. Also, as shown in FIG. 5, the small-diameter portion 13a may be included in the taper forming the diameter expansion portion 6. That is to say, the diameter expansion portion 6 in the form of a taper extends directly from the grip portion 13c. In this case, the through hole 15 can be formed using the heat treating section 17 while being expanded in diameter by the taper. In the illustrated example, the length of the large-diameter portion 13b is 10 mm, and the length of the diameter expansion portion 6 including the small-diameter portion 13a is 61 mm. The proximal end of the diameter expansion portion 6 connected to the grip portion 13c has a diameter of 2.2 mm, and the large-diameter portion 13b has a diameter of 3.2 mm.

The inventors hereof verified the effects achieved by the present invention. Using two bales of acetate tow 4Y40000 as the filter tow 5, filters were actually produced by the aforementioned filter manufacturing machine 1 at an operating speed of 1000 filters/minute. Also, filters were produced using a mandrel not provided with the diameter expansion portion 6, as a comparative example. In both cases, the number of filters produced was 4000. In the comparative example, projection of the filter tow from the surface defining the through hole was observed in 16 filters; by contrast, no such filter was found among the filters produced using the filter manufacturing machine 1 of the present invention. This proves that the present invention contributes toward preventing projection of the filter tow.

Figure 6:
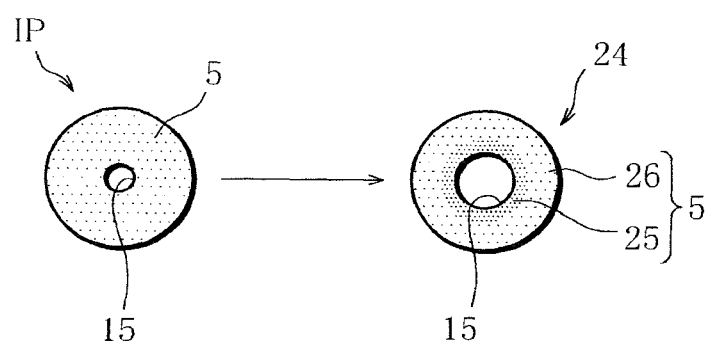
FIG. 6 is a sectional view of a hollow filter.

As explained above, the mandrel 13 provided with the diameter expansion portion 6 permits the through hole 15 to be formed by the small-diameter portion 13a and the large-diameter portion 13b having a larger diameter than the small-diameter portion 13a. To produce a hollow filter 24 shown in FIG. 6, for example, the filter tow 5 is passed through the tubular forming path 2 defined between the cylindrical forming tube 12 and the mandrel 13 arranged in alignment with the axis of the forming tube 12, to form the continuous filter body 11 having the through hole 15 along its axis in alignment with the mandrel 13, and the continuous filter body 11 is then cut to obtain the hollow filter 24. The left-hand part of FIG. 6 shows an intermediate product IP of the hollow filter 24 (continuous filter body 11) passing the small-diameter portion 13a. At this point, the filter tow 5 has an almost uniform fiber density throughout the cross-sectional area of the intermediate product IP. As the intermediate product IP passes the large-diameter portion 13b thereafter, the through hole 15 is forced radially outward to be enlarged in diameter (right-hand part of FIG. 6).

The hollow filter 24 (continuous filter body 11) is produced in this manner, and the filter tow 5 forming the hollow filter 24 has a higher fiber density in the portion surrounding the through hole 15 than in the radially outward portion. Specifically, the filter tow 5 has a high fiber density portion 25 located inward and a low fiber density portion 26 located outward, as viewed in cross section of the hollow filter 24. Thus, where the through hole 15 is formed using the mandrel 13 having the small- and large-diameter portions 13a and 13b, the filter tow 5 forming the wall surface around the through hole 15 is increased in fiber density. It is therefore possible to prevent the through hole 15 from being easily crushed and also to prevent the filter tow 5 from projecting from the surface defining the through hole 15.

EXPLANATION OF REFERENCE SIGNS

1: filter manufacturing machine
2: tubular forming path
3: forming device
4: wrapping device
5: filter tow
6: diameter expansion portion
7: feed path
8: storage vessel
9: plasticizer addition unit
10: guide roller
11: continuous filter body
12: forming tube
13: mandrel
14: holder
15: through hole
17: heat treating section
18: hole
19: filter rod
20: rod forming section
21: filter plug
22: garniture belt
23: table
24: hollow filter
25: high fiber density portion
26: low fiber density portion
IP: intermediate product

The invention claimed is:

1. A filter manufacturing machine comprising:
a feed path along which filter tow is continuously fed;
a forming device connected to a tail end of said feed path, said forming device being configured to form the filter tow into a hollow rod-shaped continuous filter body and send out the formed continuous filter body,
wherein said forming device includes:
a forming tube having a tubular forming path through which the filter tow is passed while being brought together to be formed into the continuous filter body,
a mandrel arranged in said forming tube and forming the tubular forming path in cooperation with said forming tube, and
a heat treating section provided in said forming tube and configured to heat the filter tow while the filter tow passes through the tubular forming path,
wherein said mandrel has a small-diameter portion extending from an inlet of said forming tube toward an outlet of said forming tube, a large-diameter portion connected to the small-diameter portion and located downstream of the small-diameter portion, and a diameter expansion portion formed between the small- and large-diameter portions, and
the diameter expansion portion of said mandrel is within said forming tube and located downstream of said heat treating section as viewed in a moving direction of the filter tow.

2. The filter manufacturing machine according to claim 1, wherein the large-diameter portion of said mandrel has an outer diameter equal to a diameter of a through hole to be formed in a filter as an end product.

3. The filter manufacturing machine according to claim 1, wherein the diameter expansion portion is a stepped shoulder formed on an outer surface of said mandrel.

4. The filter manufacturing machine according to claim 1, wherein the diameter expansion portion is a taper continuously formed on an outer surface of said mandrel.

5. The filter manufacturing machine according to claim 4, wherein the taper includes the small-diameter portion.

6. The filter manufacturing machine according to claim 1, wherein said heat treating section is arranged in such a position as to heat the small-diameter portion.

7. A filter manufacturing method using the filter manufacturing machine of claim 1, wherein, when a filter with a through hole is formed by feeding the filter tow into a gap between the forming tube and the mandrel,
the through hole is formed by the small-diameter portion, and
the through hole formed by the small-diameter portion is enlarged by the large-diameter portion.

* * * * *